United States Patent
Akaki et al.

(10) Patent No.: US 8,696,968 B2
(45) Date of Patent: Apr. 15, 2014

(54) METHOD OF MANUFACTURING STRETCHABLE SHEET

(75) Inventors: Kenichi Akaki, Kagawa (JP); Yoshihiko Matsumoto, Kagawa (JP)

(73) Assignee: Unicharm Corporation, Ehime (JP)

( * ) Notice: Subject to any disclaimer, the term of this patent is extended or adjusted under 35 U.S.C. 154(b) by 433 days.

(21) Appl. No.: 12/933,132

(22) PCT Filed: Mar. 11, 2009

(86) PCT No.: PCT/JP2009/054658
§ 371 (c)(1),
(2), (4) Date: Nov. 4, 2010

(87) PCT Pub. No.: WO2009/116440
PCT Pub. Date: Sep. 24, 2009

(65) Prior Publication Data
US 2011/0042849 A1   Feb. 24, 2011

(30) Foreign Application Priority Data

Mar. 19, 2008 (JP) ................................ 2008-072131

(51) Int. Cl.
B29C 55/18 (2006.01)
(52) U.S. Cl.
USPC .................................................. 264/288.4
(58) Field of Classification Search
USPC .................................................. 264/288.4
See application file for complete search history.

(56) References Cited

U.S. PATENT DOCUMENTS

| 6,605,172 | B1 * | 8/2003 | Anderson et al. | 156/199 |
| 2006/0151914 | A1 * | 7/2006 | Gerndt et al. | 264/288.4 |
| 2009/0133180 | A1 * | 5/2009 | Morita et al. | 2/79 |

FOREIGN PATENT DOCUMENTS

| EP | 0 955 027 A1 | 11/1999 |
| EP | 2 022 879 A1 | 2/2009 |
| JP | 2002-513723 A | 5/2002 |
| JP | 2003-510206 A | 3/2003 |
| JP | 2007-077384 | 7/2007 |
| WO | WO 2007/138733 A1 | 12/2007 |

OTHER PUBLICATIONS

International Search Report from corresponding PCT application No. PCT/JP2009/054658 dated Jun. 9, 2009, 2 pages.
Chinese First Office Action from corresponding Chinese Application No. 200980109816.5 dated Sep. 27, 2011 (6 pgs).
Chinese Second Office Action and English translation from corresponding Chinese Application No. 200980109816.5 dated Jul. 30, 2012 (13 pgs).

* cited by examiner

Primary Examiner — Yogendra Gupta
Assistant Examiner — Robert J Grun
(74) Attorney, Agent, or Firm — Brinks Gilson & Lione

(57) ABSTRACT

A method of producing a stretchable sheet that involves: passing a nonwoven fabric including a plurality of types of fibers through a gap between a pair of gear rolls and that rotate while a plurality of teeth and formed on an outer circumferential surface and of each of the pair of gear rolls and engage with one another; and drawing the nonwoven fabric in a circumferential direction of the gear rolls and by the teeth. A circumferential velocity S of the gear rolls and is within a range of 50 to 300 m/min. A maximum value of distortion per unit time applied to the nonwoven fabric in the gap between the pair of gear rolls and is within a range of 5 to 100 $\sec^{-1}$.

12 Claims, 14 Drawing Sheets

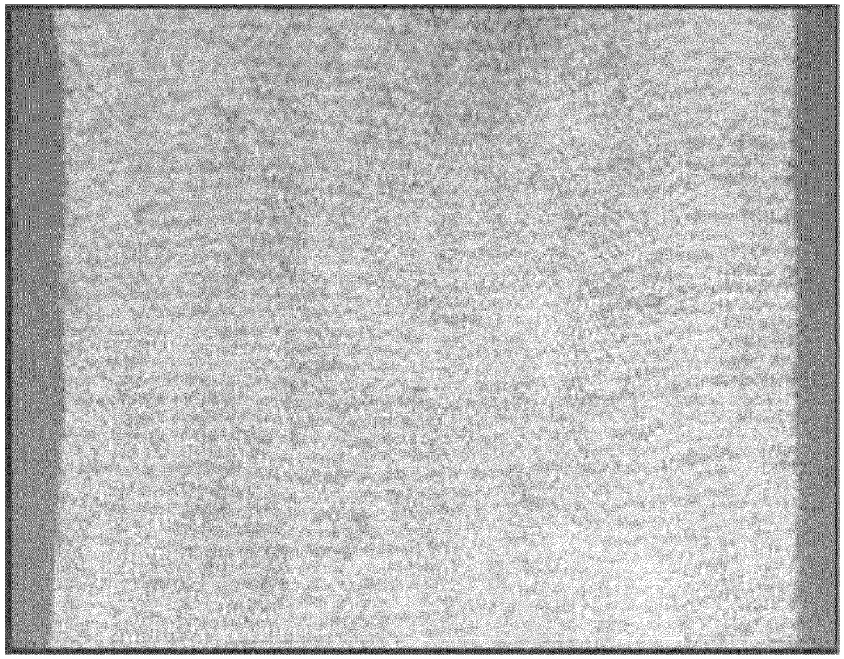
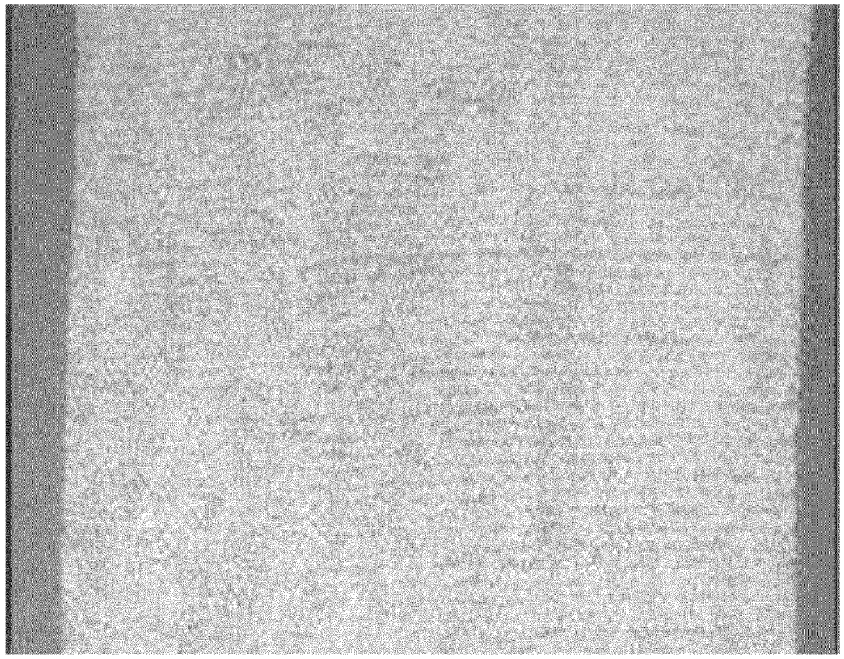

METHOD OF MANUFACTURING STRETCHABLE SHEET

RELATED APPLICATION

This application is a 35 U.S.C. §371 national phase filing of International Patent Application No. PCT/JP2009/054658, filed Mar. 11, 2009, through which and to which priority is claimed under 35 U.S.C. §119 to Japanese Patent Application No. 2008-072131, filed Mar. 19, 2008.

TECHNICAL FIELD

The present invention relates to a method of manufacturing a stretchable sheet.

BACKGROUND ART

In a disposable diaper as an example of sanitary materials, a stretchable sheet is often used as a fastening member that fastens around a torso of a wearer (for example, portions around waist of a front body or a rear body). The stretchable sheet is manufactured by, for example, performing a drawing process on a nonwoven fabric as a material (refer to Patent Literature 1, for example). And a method called "gear drawing" is mentioned as an example of the drawing process (refer to Patent Literature 2, for example).
Patent Literature 1: JP-A-2002-513723
Patent Literature 2: JP-A-2007-177384

DISCLOSURE OF INVENTION

Problem to be Solved by the Invention

The "gear drawing" is a method in which, a nonwoven fabric is drawn by a pair of upper and lower gear rolls with teeth formed in each outer circumferential surfaces. More specifically, the nonwoven fabric is passed through a gap between the pair of upper and lower gear rolls, and the nonwoven fabric is deformed into a shape bent at three points by the teeth of the upper and lower gear rolls that engage with one another so as to be drawn. And after the drawing, stretchability is developed in the nonwoven fabric and thereby becomes a stretchable sheet.

However, since the nonwoven fabric is drawn by the engagement of the teeth, the nonwoven fabric may be seriously damaged depending on conditions of the gear drawing (a circumferential velocity of the gear roll or the like), and in some cases, there is a fear that the nonwoven fabric may be ruptured during the drawing.

In this regard, as a result of an earnest research conducted by applicants of the present application, it turned out that (1) a distortion speed of the nonwoven fabric (distortion per unit time applied to the nonwoven fabric) in a gap between a pair of gear rolls changes every moment from entry to exit of the gap, (2) the distortion speed has a peak, and (3) a maximum value of the distortion speed that is the peak of the distortion speed affects damage to the nonwoven fabric. And thereby the invention of the present application is achieved.

The present invention has been contrived in view of above conventional problems, and it is an object thereof to provide a method of manufacturing a stretchable sheet that can effectively suppress damage to a nonwoven fabric in the case of drawing the nonwoven fabric by passing through a gap between a pair of rotating gear rolls.

Means for Solving the Problem

A main aspect of the invention for solving the foregoing issue is
a method of producing a stretchable sheet including:
passing a nonwoven fabric including a plurality of types of fibers through a gap between a pair of gear rolls that rotate while a plurality of teeth formed on an outer circumferential surface of each of the pair of gear rolls engage with one another; and
drawing the nonwoven fabric in a circumferential direction of the gear rolls by the teeth, wherein
a circumferential velocity of the gear rolls is within a range of 50 to 300 (m/min), and
a maximum value of distortion per unit time applied to the nonwoven fabric in the gap between the pair of gear rolls is within a range of 5 to 100 $(\sec^{-1})$.

Features of the invention other than the above will become clear by the description of the present specification and the accompanying drawings.

Effect of the Invention

According to the present invention damage to a nonwoven fabric can be effectively suppressed in the case of drawing the nonwoven fabric by passing through a gap between a pair of rotating gear rolls.

BRIEF DESCRIPTION OF DRAWINGS

FIGS. 9A and 9B are photographs of a surface of the nonwoven fabric 3 after being drawn by setting the maximum value of the local distortion speed during the gear drawing to 100 $(\sec^{-1})$ and 110 $(\sec^{-1})$, respectively.

BEST MODE FOR CARRYING OUT THE INVENTION

Figure 1:
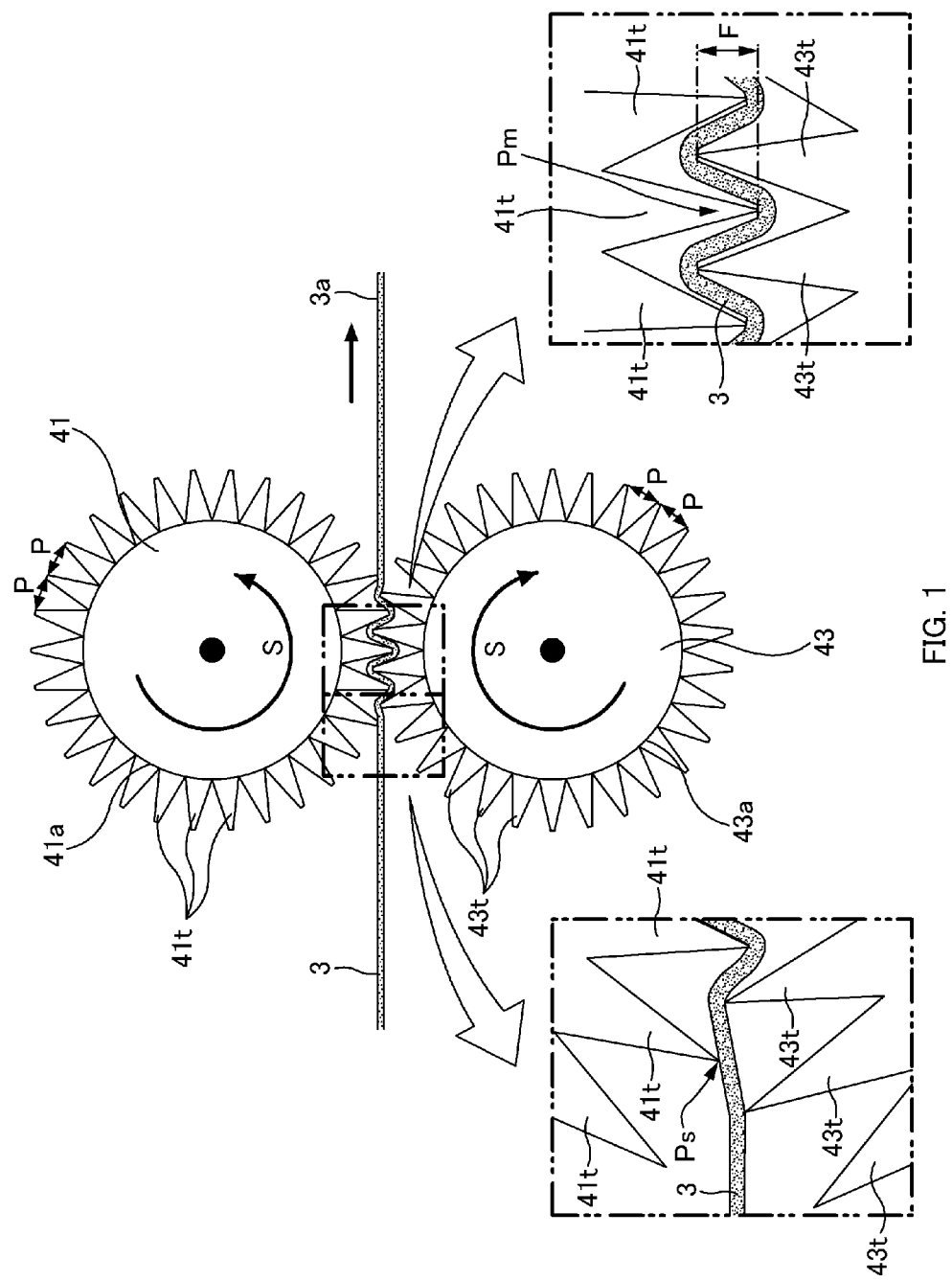
FIG. 1 is a side view illustrating a gear drawing, with a part of which is enlarged.

At least the following matters will be made clear by the description of the present specification with reference to the accompanying drawings.

A method of producing a stretchable sheet including:

passing a nonwoven fabric including a plurality of types of fibers through a gap between a pair of gear rolls that rotate while a plurality of teeth formed on an outer circumferential surface of each of the pair of gear rolls engage with one another; and drawing the nonwoven fabric in a circumferential direction of the gear rolls by the teeth, wherein a circumferential velocity of the gear rolls is within a range of 50 to 300 (m/min), and a maximum value of distortion per unit time applied to the nonwoven fabric in the gap between the pair of gear rolls is within a range of 5 to 100 (sec$^{-1}$).

With such a method of manufacturing a stretchable sheet, a numerical range is specified in the maximum value of distortion per unit time applied to the nonwoven fabric. Here, the maximum value can be accurately associated with damage to the nonwoven fabric that may occur during drawing. Thus, the damage to the nonwoven fabric during drawing can be effectively suppressed by specifying the numerical range of the maximum value.

Moreover, since the maximum value of distortion per unit time applied to the nonwoven fabric is set to 100 (sec$^{-1}$) or less, the damage to the nonwoven fabric during drawing can be effectively suppressed. Furthermore, since the maximum value is set to 5 (sec$^{-1}$) or more, deterioration of productivity caused by setting the maximum value to an excessively low level can also be effectively prevented.

In such a method for producing a stretchable sheet, it is preferable that a diameter of the pair of gear rolls is within a range of 300 to 600 (mm).

With such a method of manufacturing a stretchable sheet, since the diameter of the gear roll is set to 300 (mm) or more, the maximum value of distortion per unit time can be easily decreased and as a result, the conditions for satisfying the above-described requirement of which the maximum value is 100 (sec$^{-1}$) or less, for example, conditions such as the circumferential velocity of the gear roll, the formation pitch of the teeth in the circumferential direction, and the total distortion applied to the nonwoven fabric can be eased; in other words, the settable ranges of these values can be broadened.

Moreover, since the diameter is set to 600 (mm) or less, the gear roll can be manufactured cheaply, and thus the production costs can be reduced.

Furthermore, since the diameter of the gear roll is set within the range of 300 to 600 (mm), the maximum value of the local distortion speed can be efficiently decreased.

In such a method for producing a stretchable sheet, it is preferable that the diameter of the pair of gear rolls is within a range of 450 to 600 (mm).

With such a method of manufacturing a stretchable sheet, when compared with gear rolls having diameter of less than 450 (mm), the circumferential velocity of the gear roll can be increased while maintaining the same maximum value of distortion per unit time, and as a result, it is possible to enhance the productivity.

In such a method for producing a stretchable sheet, it is preferable that the nonwoven fabric includes, as the plurality of types of fibers, at least a stretchable fiber and an extensible fiber that undergoes plastic deformation by an elongation smaller than an elongation of the stretchable fiber at an elastic limit, and the stretchable fiber is a thermoplastic elastomer fiber and the extensible fiber is a thermoplastic polyolefin fiber.

With such a method of manufacturing a stretchable sheet, since the nonwoven fabric includes the thermoplastic elastomer fiber and the thermoplastic polyolefin fiber as the stretchable fiber and the extensible fiber, respectively, stretchability can be reliably expressed in the nonwoven fabric after drawing.

In such a method for producing a stretchable sheet, it is preferable that the diameter of the gear roll is determined based on the distortion applied to the nonwoven fabric by the gear roll, the circumferential velocity of the gear roll, a formation pitch of the teeth in the circumferential direction or an engagement depth between the teeth of the pair of gear rolls, and the maximum value of distortion per unit time.

With such a method of manufacturing a stretchable sheet, the diameter of the gear roll of which the damage to the nonwoven fabric during drawing can be effectively suppressed can be easily achieved.

Method for Producing Stretchable Sheet 3a of the Present Embodiment

Gear Drawing

FIG. 1 is an explanatory diagram of the gear drawing. The gear drawing is performed using a pair of upper and lower gear rolls 41 and 43, in which teeth (teeth having the same shape as the teeth of so-called "spur gear") are formed in a wave form in a circumferential direction at a predetermined formation pitch P on outer circumferential surfaces 41a and 43a. That is, while the gear rolls 41 and 43 both having same shape as the other driven rotate at a constant circumferential velocity S, a nonwoven fabric 3 is passed through a gap between the gear rolls 41 and 43 and the nonwoven fabric 3 is deformed by bending at three points by the teeth 41t of the upper gear roll 41 and the teeth 43t of the lower gear roll 43 that engage with one another (see the right enlarged view in FIG. 1), so as to be drawn in the circumferential direction of the gear rolls 41 and 43. After the drawing, stretchability is developed in the nonwoven fabric 3 and becomes a stretchable sheet 3a.

The nonwoven fabric 3 used as a material in the gear drawing is, for example, a commingled-type nonwoven fabric 3 which is produced by blending an extensible fiber and a stretchable fiber in a predetermined mixing ratio by melt spinning or the like. Here, the stretchable fiber is a fiber that can elastically-extend and the extensible fiber is a fiber that can substantially extend in a non-elastic manner. In other words, the extensible fiber means a fiber that undergoes plastic deformation with an elongation smaller than the elongation at an elastic limit of the stretchable fiber.

An example of the extensible fiber is a thermoplastic polyolefin fiber, and an example of the stretchable fiber is a thermoplastic elastomer fiber. Examples of the thermoplastic polyolefin fiber include single fibers, such as a polypropylene fiber and a polyester fiber, and a conjugate fiber having a sheath core structure and that are polypropylene or polyester, and the thermoplastic elastomer fiber is, for example, a polyurethane fiber.

A spunbonding method and a chemical-bonding method or the like are mentioned as the methods of manufacturing the nonwoven fabric 3. Moreover, basis weight and fiber diameter of the nonwoven fabric 3 is suitably selected within ranges of 20 to 50 (g/m$^2$) and 10 to 30 (μm), respectively. Furthermore, the mixing ratio of the extensible fiber and the stretchable fiber is suitably selected within range of 20 to 80%.

The formation pitch P of the teeth 41t (43t) of the gear roll 41 (43) is selected within a range of 2 to 6 (mm), preferably of 4 to 5 (mm), and 4.9 (mm) in an example below. The circumferential velocity S of the gear roll 41 (43) is selected within a range of 50 to 300 (m/min). The circumferential velocity S mentioned here refers to the velocity of the tips of the teeth 41t (43t). Moreover, a maximum engagement depth F between the upper gear roll 41 and the lower gear roll 43 is determined based on a total distortion $\epsilon_{all}$ that should be applied to the nonwoven fabric 3 and the above-described formation pitch P (see Formula 2 described later); that is, the maximum engagement depth F is selected so as to achieve the total distortion $\epsilon_{all}$ selected within a range of 0.6 to 2.0, in the above-described range of the formation pitch P. The definition and the like of the total distortion $\epsilon_{all}$ will be described later.

Figure 2A:
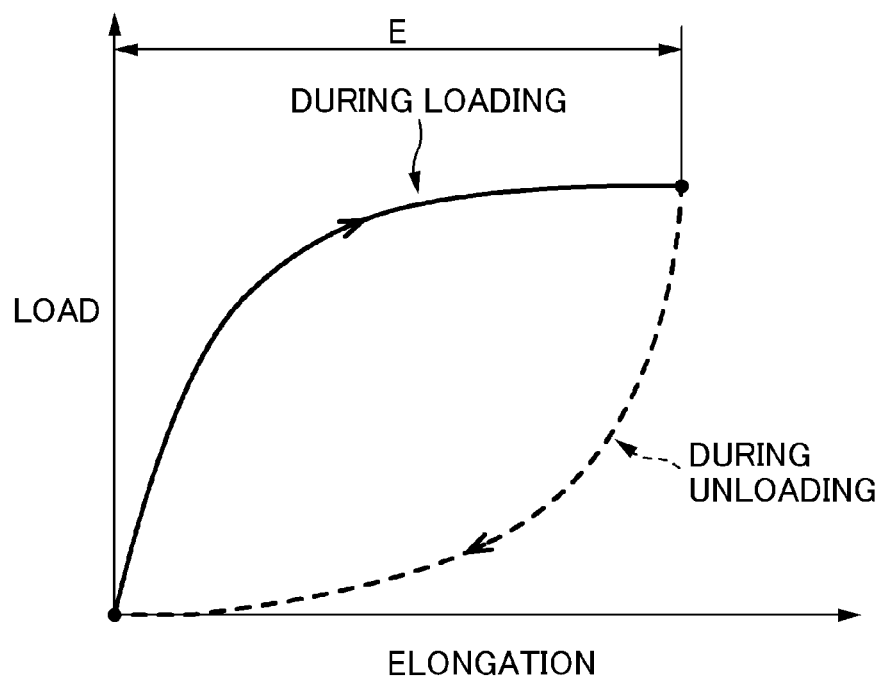
FIGS. 2A and 2B are diagrams explaining a mechanism in which stretchability is developed by a drawing process, and show a load-elongation curve of a nonwoven fabric 3.
Figure 2B:
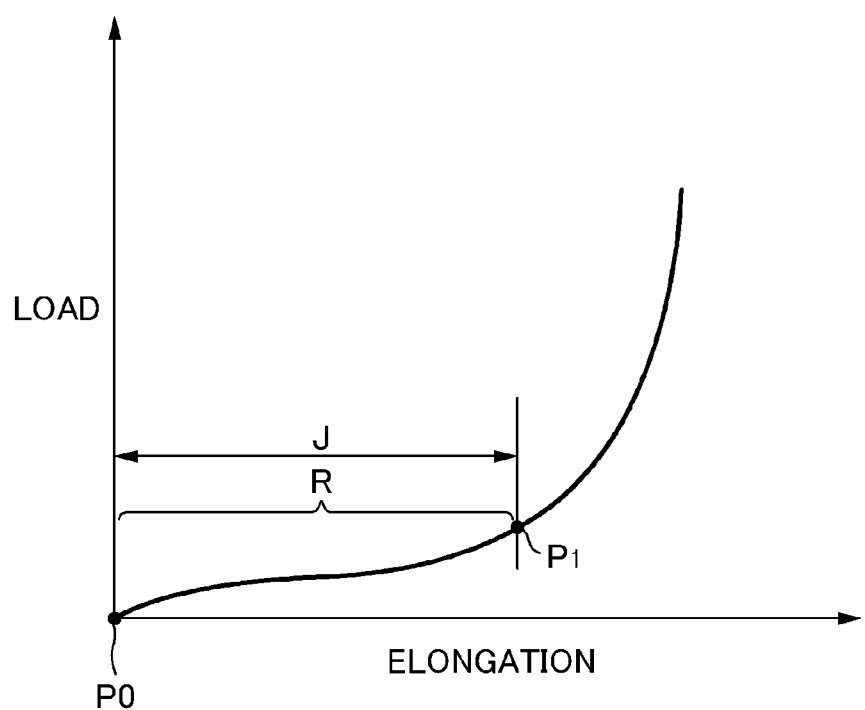

FIGS. 2A and 2B are diagrams explaining a mechanism in which the stretchability is developed in the nonwoven fabric 3 due to the gear drawing. FIGS. 2A and 2B both show the load-elongation curve of the nonwoven fabric 3.

When a tension (hereinafter also referred to as a "load") is applied to an undrawn nonwoven fabric 3 within the elastic limit of the stretchable fiber in order to perform the drawing process on the undrawn nonwoven fabric 3, the load-elongation curve as shown in FIG. 2A is obtained during such drawing process. That is, the load-elongation curve is obtained that includes a hysteresis in which the load under the same elongation becomes lower when the tension is being released than when the tension is being applied.

And, in the case where the tension is applied again after the drawing, the load-elongation curve as shown in FIG. 2B is drawn. Further described, the nonwoven fabric 3 stretches at a significantly low elastic modulus from an origin P0 to an inflection point P1 in FIG. 2B. However, the load rapidly increases in a substantially quadratic curve form once the elongation exceeds the inflection point P1. And normally, by the development of this low elastic modulus range R, the stretchability is considered to have been developed in the nonwoven fabric 3 by the drawing process. And an elongation amount J from the origin P0 in an unloaded state to the inflection point P1 is defined as a "developed stretch amount J".

Incidentally, the reason of the nonwoven fabric 3 stretching at a significantly low elastic modulus from the origin P0 to the inflection point P1 after the drawing process can be explained as below.

Figure 3A:
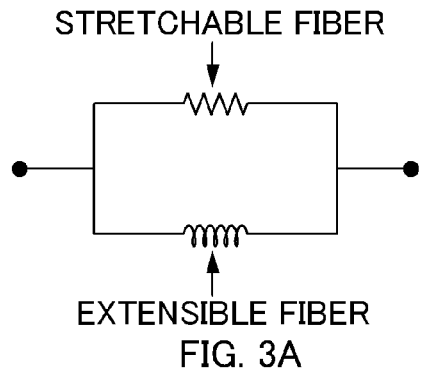
FIG. 3A is a schematic view showing a state of fiber before the drawing process (that is, an undrawn state).
Figure 3B:
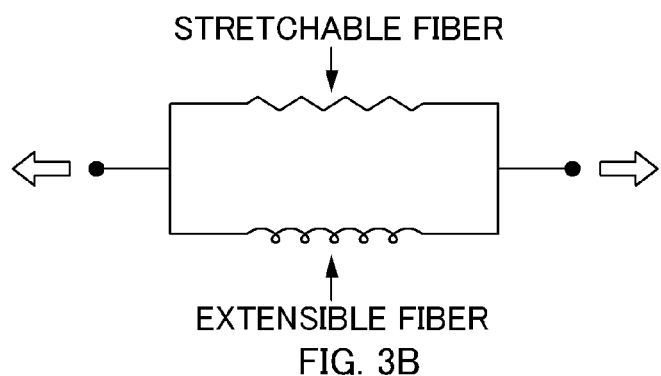
FIG. 3B is a schematic view showing a state of fiber during the drawing process (that is, during loading).
Figure 3C:
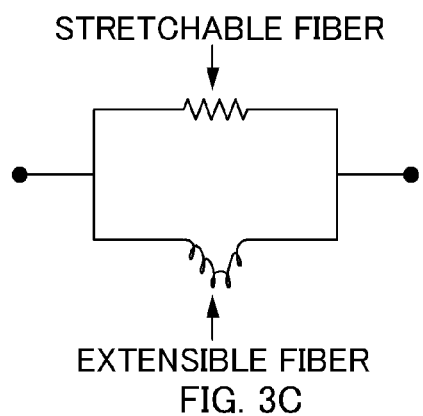
FIG. 3C is a schematic view showing a state of fiber after the drawing process (that is, after unloading).

FIG. 3A is a schematic view showing a state of fiber before the drawing process (that is, an undrawn state), FIG. 3B is a schematic view showing a state of fiber during the drawing process (that is, during loading), and FIG. 3C is a schematic view showing a state of fiber after the drawing process (that is, after unloading). Note that, a minimum unit structure that generally constitutes the nonwoven fabric 3 can be modeled as the stretchable fiber connected parallel to the extensible fiber as shown in FIG. 3A.

In the case where the undrawn nonwoven fabric 3 shown in FIG. 3A is drawn, the stretchable fiber undergoes elastic deformation as shown in FIG. 3B. However, the extensible fiber whose elongation at the elastic limit is smaller than that of the stretchable fiber undergoes the plastic deformation at a comparatively early stage and is elongated by the plastic deformation. Accordingly, when the tension is released in this state, as shown in FIG. 3C, the stretchable fiber is simply released from the elastic elongation, that is, the total length thereof retrieves substantially the same length as the length before applying the tension. However, the total length of the extensible fiber is elongated for the amount of the plastic elongation and is in a slack state.

Figure 3D:
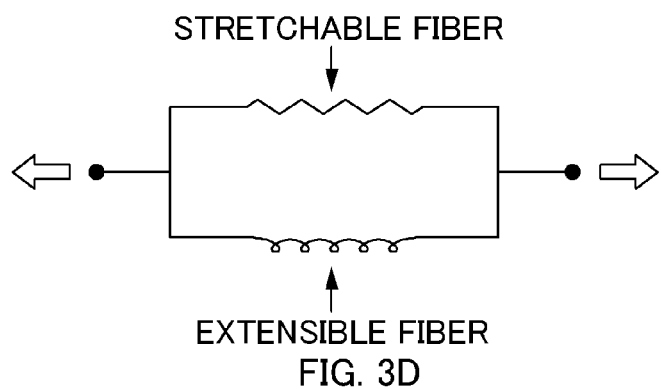
FIG. 3D is a schematic view showing a state of fiber in the case where the nonwoven fabric 3 is drawn again after the drawing process.

And if the tension is applied again to the nonwoven fabric 3 that has undergone the drawing process, the nonwoven fabric 3 resists the above tension only by the elastic deformation of the stretchable fiber until the slack portion of the extensible fiber is fully extended and the entire length thereof is stretched. Therefore the nonwoven fabric 3 is extended at a significantly low elastic modulus as shown in FIG. 2B. However, from the point at which the slack in the extensible fiber is cleared and the extensible fiber is stretched over the entire length thereof, as shown in FIG. 3D, the elastic-plastic deformation of the extensible fiber starts to resist the tension. Accordingly, the tension required to extend the nonwoven fabric 3 rapidly increases from that point. That is, the point at which the slack in the extensible fiber is cleared is the inflection point P1 in FIG. 2B, and based on the descriptions given so far, the load-elongation curve after the drawing process is such that the nonwoven fabric 3 is stretched at an extremely low elastic modulus until the inflection point P1, and the load rapidly increases after exceeding the inflection point P1, as shown in FIG. 2B. Incidentally, it goes without saying that when the tension is released within the range R of the origin P0 to the inflection point P1, namely, within the range R of the "developed stretch amount J", the load-elongation curve substantially tracks back along the load-elongation curve during loading shown in FIG. 2B, and returns to the origin P0.

Here, a parameter referred to as a "drawing distortion $\epsilon_{all}$" is introduced as a parameter that is synonymous with a drawing amount E during the drawing. Same as the concept of ordinary distortion, the drawing distortion $\epsilon_{all}$ is defined by following Expression 1 using an entire length Lb in a drawing direction during the drawing and an entire length La in a drawing direction before the drawing:

$$\epsilon_{all}=(Lb-La)/La \qquad \text{Expression 1}$$

Figure 4A:
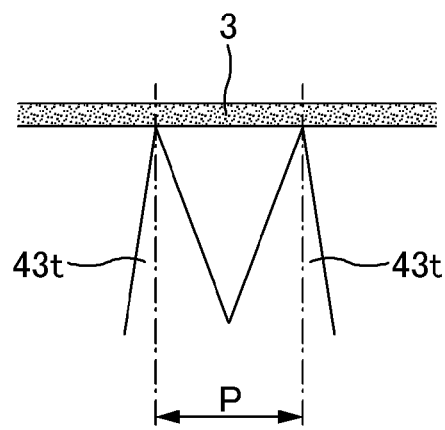
FIGS. 4A and 4B are diagrams applied to formulation of a total distortion $\epsilon_{all}$ that is a drawing distortion.
Figure 4B:
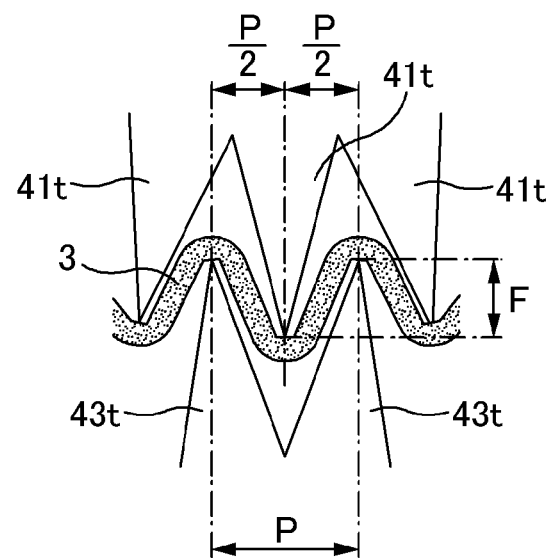

From geometrical relationship between the teeth 41t and 43t shown in FIGS. 4A and 4B, the drawing distortion $\epsilon_{all}$ is expressed as a function of the maximum engagement depth F between the teeth 41t and 43t and the formation pitch P of the teeth 41t (43t). That is, the nonwoven fabric 3 in which the original total length before the gear drawing is P at an engagement start point Ps in an enlarged view on the left side in FIG. 1, as shown in FIG. 4A, is deformed by being bent at three points by the teeth 41t and 43t that engage with one another at the maximum engagement depth F as shown in FIG. 4B during the drawing at a maximum engagement point Pm shown in the enlarged view on the right side in FIG. 1B, and thus the drawing distortion $\epsilon_{all}$ is expressed as in Expression 2 below:

$$\epsilon_{all}=2\times(\sqrt{(F_2+(P/2)^2)}-(P/2))/P \qquad \text{Expression 2}$$

Since the drawing distortion $\epsilon_{all}$ is a total value of distortion applied by the gear drawing, hereinafter the drawing distortion $\epsilon_{all}$ is also referred to as the total distortion $\epsilon_{all}$ and is distinguished from a distortion $\epsilon$ according to a local distortion speed that is described later.

Distortion Speed of the Nonwoven Fabric 3 During the Gear Drawing

Generally, in the case of pulling and deforming a workpiece, the faster the distortion speed (distortion per unit time applied to the workpiece), the greater the damage to the workpiece and the workpiece may be ruptured during the processing in the worst case. For this reason, it is important to reduce the distortion speed during the process, and the gear drawing is no exception.

Here, for a referential method of obtaining the distortion speed in the gear drawing, for example, a method can be considered of dividing the above-described total distortion $\epsilon_{all}$ applied from the engagement start point Ps to the maximum engagement point Pm in FIG. 1 by a time $t_{all}$ for applying that total distortion $\epsilon_{all}$, namely, the time needed for the rotation from the engagement start point Ps to the maximum engagement point Pm. This method obtains the distortion speed on the assumption that the distortion speed is constant from the engagement start point Ps to the maximum engagement point Pm, in other words, this method obtains an average value ($=\epsilon_{all}/t_{all}$) of the distortion speed.

Figure 5:
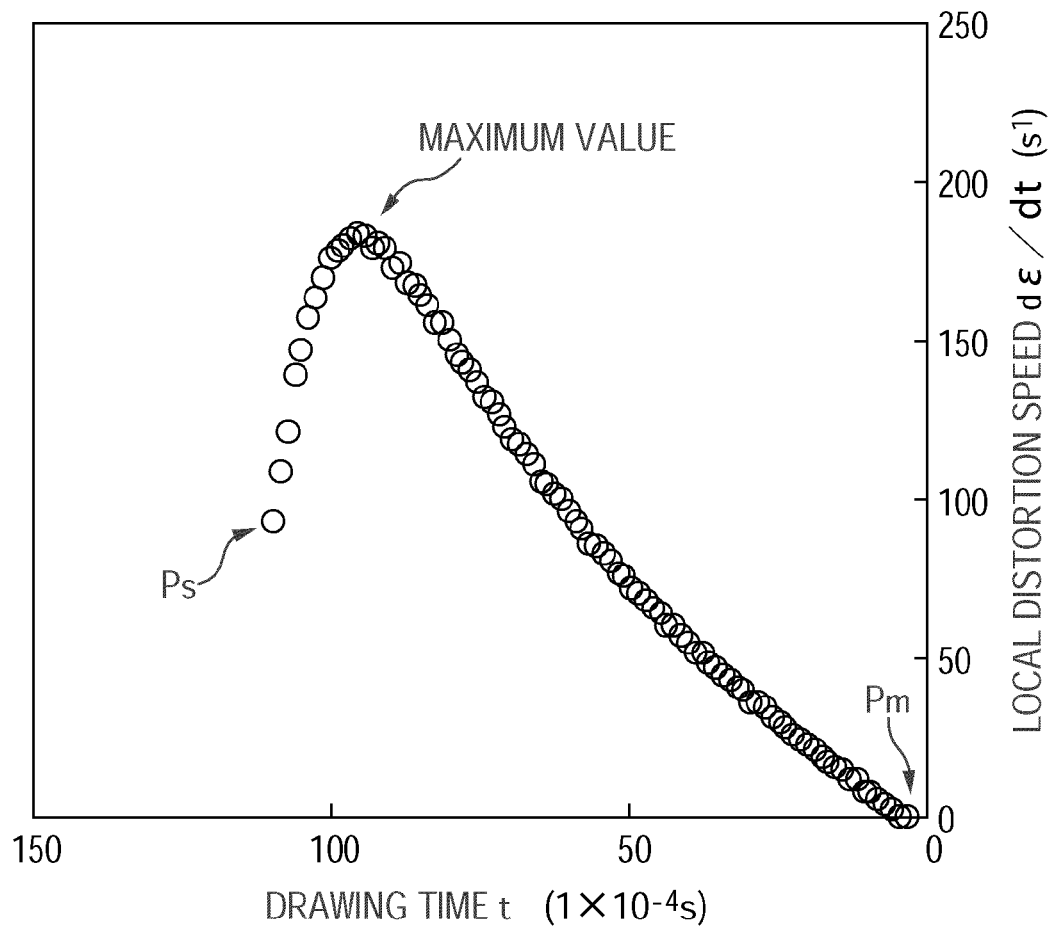
FIG. 5 is a graph showing changes in a distortion speed $d\epsilon/dt$ applied from an engagement start point Ps to a maximum engagement point Pm.

However, according to an earnest research conducted by the applicant of the present application, it had turned out that even in the case where the drawing is performed while maintaining the constant circumferential velocity S of the gear rolls 41 and 43, the distortion speed during the drawing changes every moment rather than being constant through a range of the engagement start point Ps to the maximum engagement point Pm, as shown in FIG. 5 described later and the distortion speed has a peak within the range. Moreover, it goes without saying that the value of the peak is greater than the average value ($=\epsilon_{all}/t_{all}$) obtained by the above-described referential method. Therefore, in such case, it is considered that the maximum value of the distortion speed can be more accurately associated with a damage that might occur on the nonwoven fabric 3 than the average value ($=\epsilon_{all}/t_{all}$) obtained by the above-described referential method, when used as an indicator.

Thus, in the method of manufacturing the stretchable sheet 3a according to the present embodiment, a distortion speed $d\epsilon/dt$ at each moment within a range of the engagement start point Ps to the maximum engagement point Pm is obtained at predetermined rotation angle $\Delta\theta$ intervals, and the maximum value that is the peak value of the distortion speeds $d\epsilon/dt$ at respective moments is adopted as an indicator, and the various conditions of the gear drawing are set so as to include this maximum value within a predetermined range. In this manner, the damage to the nonwoven fabric 3 is effectively suppressed.

Hereinafter, the method of manufacturing the stretchable sheet 3a according to the present embodiment will be described while showing the achieved findings.

FIG. 5 is a graph showing changes in the distortion speed $d\epsilon/dt$ applied from the engagement start point Ps to the maximum engagement point Pm. Time t is plotted on a horizontal axis, and the distortion speed $d\epsilon/dt$ is plotted on a vertical axis. Moreover, in FIG. 5, the left end of the graph is the engagement start point Ps and the right end of the graph is the maximum engagement point Pm, and the time t of the maximum engagement point Pm is shown aligned with the zero point of the time axis. Note that drawing data is shown on the margin of the graph, however the circumferential velocity S of the gear rolls 41 and 43 during the drawing is constant at 200 (m/min).

As can be seen from FIG. 5, even if the circumferential velocity S of the gear rolls 41 and 43 is maintained constant, the distortion speed changes rather than being constant. Moreover, the distortion speed reaches the maximum value at a position closer to the engagement start point Ps than to the maximum engagement point Pm. Incidentally, it has become clear that damage is more likely to occur on the nonwoven fabric 3 when the maximum value of the distortion speed is positioned closer to the engagement start point Ps than to the maximum engagement point Pm.

Figure 6:
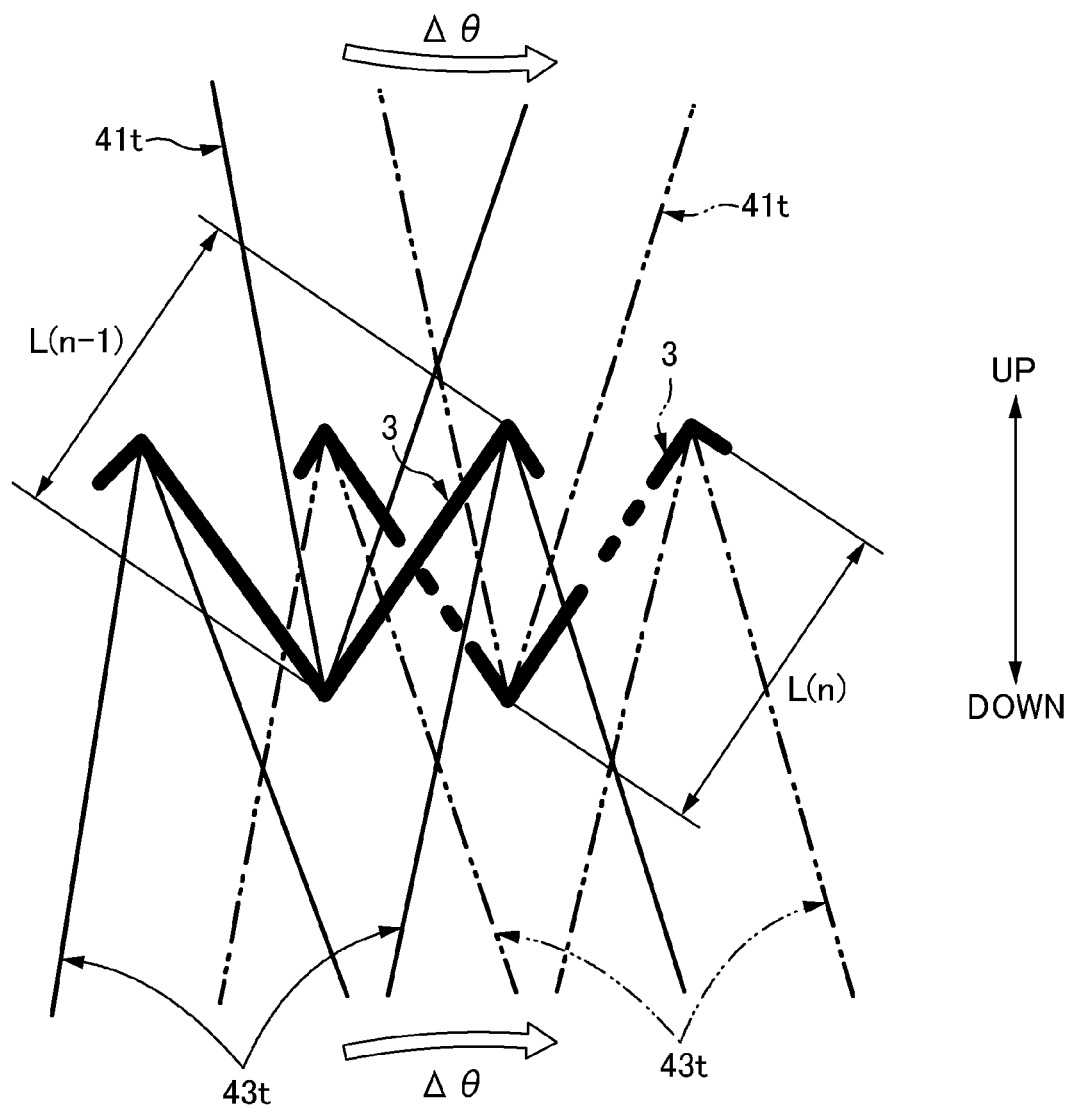
FIG. 6 is an engagement state diagram.

Such graph is acquired by diagramming. In other words, as shown by a solid line and a chain double-dashed line in FIG. 6, first, while the upper and lower gear rolls 41 and 43 are successively rotated by 0.1° as an example of the predetermined rotation angle $\Delta\theta$, engagement states between the teeth 41t and 43t at respective moments are diagrammed. Then, a length L(n) of the nonwoven fabric 3 in a focused engagement state diagram (the chain double-dashed line in FIG. 6) and a length L(n−1) of the nonwoven fabric 3 in an engagement state diagram (the solid line in FIG. 6) immediately before the focused engagement state diagram are obtained by measuring the lengths in these diagrams and are substituted into Expression 3 below, thereby obtaining the distortion speed $d\epsilon/dt$ (hereinafter also referred to as a "local distortion speed $d\epsilon/dt$") at the focused moment.

$$d\epsilon/dt=(L(n)-L(n-1))/L(n-1)/\Delta t \qquad \text{Expression 3}$$

Note that $\Delta t$ in above Expression 3 is a time needed for changing state between the focused engagement state diagram and the engagement state diagram immediately before that, namely, a time needed for a rotation of 0.1° which is the above-described rotation angle $\Delta\theta$. The time $\Delta t$ is obtained by following Expression 4 using a diameter D (m) (hereinafter also referred to as a "roll diameter D") of the gear rolls 41, 43 and the circumferential velocity S (m/min).

$$\Delta t(\text{sec})=(\pi \times D/S)\times 60\times(\Delta\theta/360°) \qquad \text{Expression 4}$$

Then, while successively shifting the focused engagement state diagram from the engagement start point Ps to the maximum engagement point Pm, the local distortion speed $d\epsilon/dt$ at each moment is obtained based on above Expressions 3 and 4 and thus the graph in FIG. 5 can be obtained.

Figure 7A:
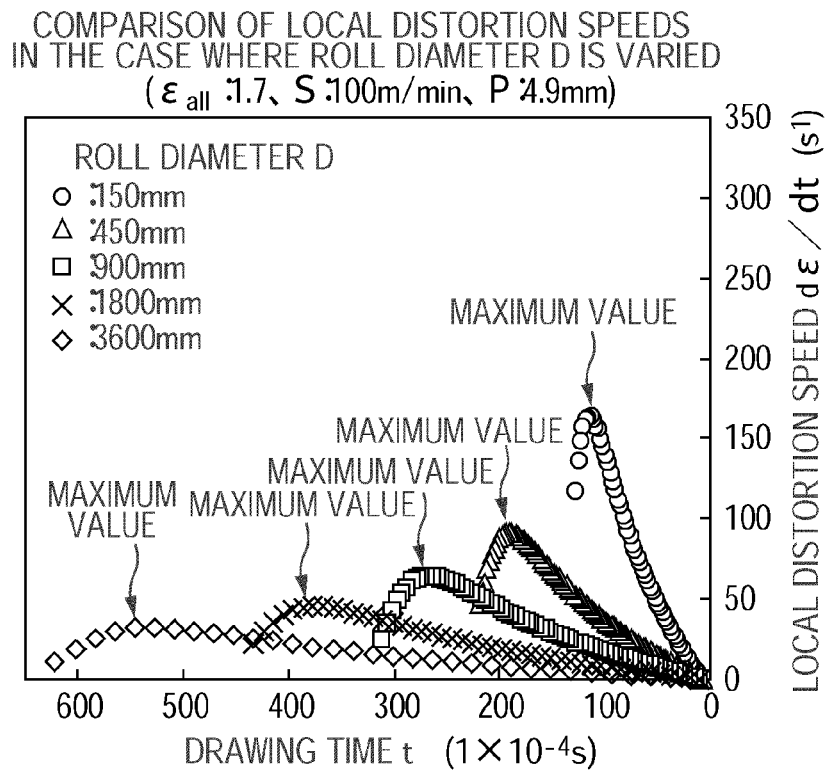
FIGS. 7A and 7B are graphs showing relationship between a drawing time t and a local distortion speed dc/dt in a roll gap.
Figure 7B:
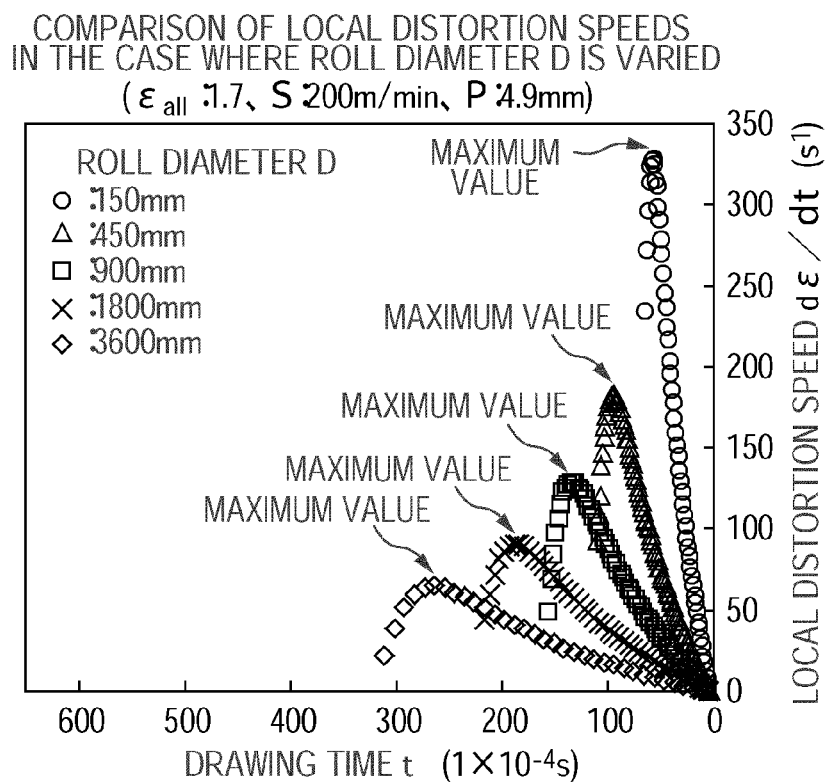
Figure 8B:
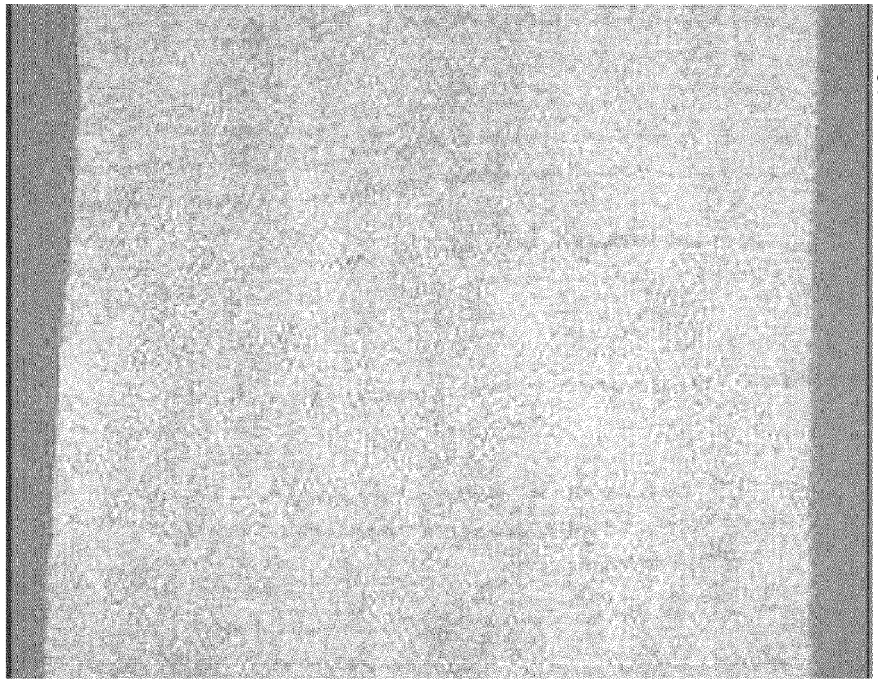
FIGS. 8A and 8B are photographs of a surface of the nonwoven fabric 3 after being drawn by setting a maximum value of the local distortion speed during the gear drawing to 90 $(\sec^{-1})$ and 95 $(\sec^{-1})$ respectively.
Figure 8A:
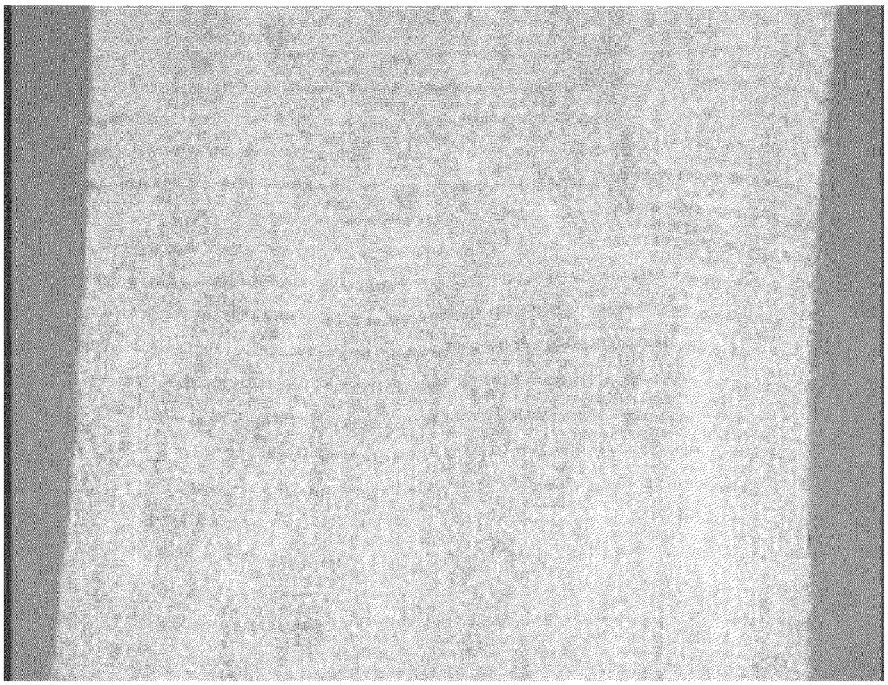
Figure 10:
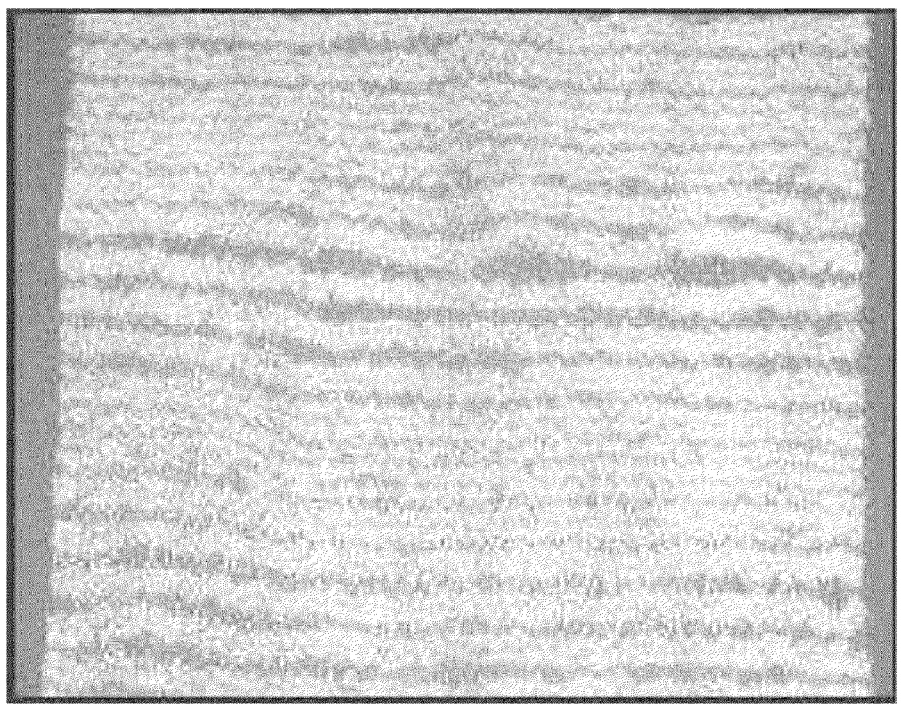
FIG. 10 is a photograph of the surface of the nonwoven fabric 3 after being drawn by setting the maximum value of the local distortion speed during the gear drawing to 115 $(\sec^{-1})$.

FIGS. 7A and 7B are graphs showing a relationship between the drawing time t and the local distortion speed $d\epsilon/dt$ in the roll gap (the range from the engagement start point Ps to the maximum engagement point Pm), which have been obtained by varying the roll diameter D among four levels (150, 450, 900, 1800, and 3600 (mm)) while fixing conditions other than the roll diameter D. FIG. 7A shows the graphs in the case where the circumferential velocity S is 100 (m/min), and FIG. 7B shows the graphs in the case where the circumferential velocity S is 200 (m/min). Moreover, the roll diameter D refers to the maximum diameter that is from tip to tip of the teeth 41t (43t).

From FIGS. 7A and 7B, it is clear that the larger the roll diameter D, the smaller the maximum value of the local distortion speed. Moreover, a comparison between FIG. 7A and FIG. 7B indicates that the slower the circumferential velocity S, the smaller the maximum value of the local distortion speed. That is, it is clear that the local distortion speed changes depending on the roll diameter D and the circumferential velocity S.

Here, although it is not shown in the graphs here, it has also been made clear that the above-described local distortion speed changes depending also on the total distortion $\epsilon_{all}$, and the smaller the total distortion $\epsilon_{all}$, the smaller the maximum value of the local distortion speed.

FIGS. 8A to 10 are diagrams for describing the relationship between the maximum value of the local distortion speed and the damage level of the nonwoven fabric 3, and each diagram is a photograph of a surface of the nonwoven fabric 3 after being drawn by setting the maximum value of the local distortion speed at the gear drawing as 90, 95, 100, 110, and 115 (sec$^{-1}$) successively. Further, in all of these cases the roll diameter D is 450 (mm) and the formation pitch P is 4.9 (mm).

Looking at these photographs, it is clear that in the case where the maximum value of the local distortion speed is 110 (sec$^{-1}$) and 115 (sec$^{-1}$), streaky density irregularities of the fiber occur on the surface of the nonwoven fabric and the damage during drawing is serious. However, in the case where the maximum value of the local distortion speed is 100 (sec$^{-1}$) or less, the streaky density irregularities are hardly observed, and the damage during drawing is reduced to a negligibly small level.

Thus, in the method of manufacturing the stretchable sheet 3a according to the present embodiment, the various conditions of the gear drawing are set so as to include the maximum value of the local distortion speed $d\epsilon/dt$ within a range of 5 to 100 (sec$^{-1}$).

Procedure of Setting the Various Conditions of the Gear Drawing

Figure 11:
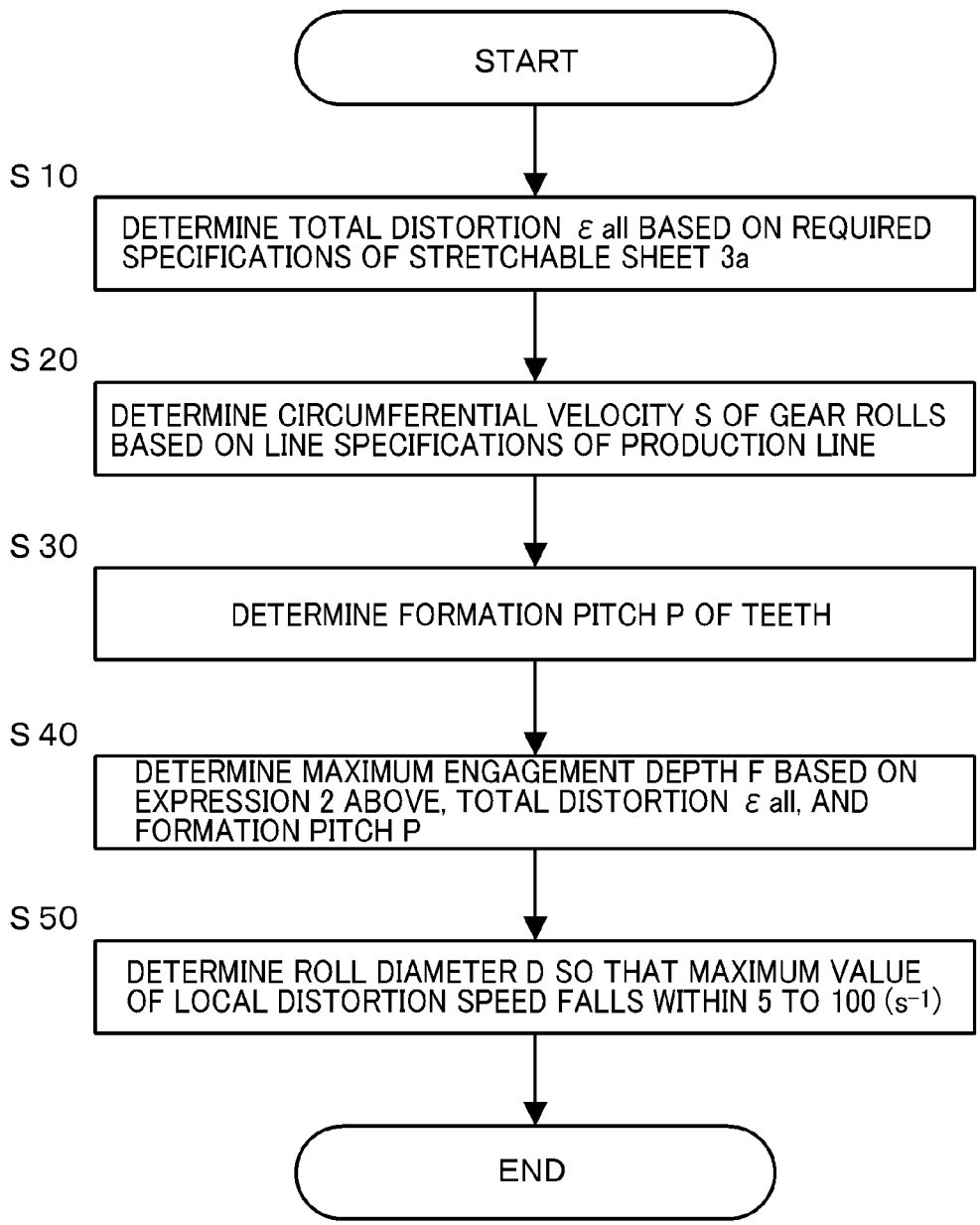
FIG. 11 is a flowchart of an example of a procedure for setting various conditions of the gear drawing.

FIG. 11 is a flowchart of an example of a procedure of setting the various conditions of the gear drawing.

The various conditions to be set include the total distortion $\epsilon_{all}$ that should be applied to the nonwoven fabric 3, the circumferential velocity S of the gear roll 41 (43), the formation pitch P of the teeth 41t (43t), the maximum engagement depth F between the teeth 41t of the upper gear roll 41 and the teeth 43t of the lower gear roll 43, and the roll diameter D that is the diameter D of the gear roll 41 (43).

First, the total distortion $\epsilon_{all}$ that should be applied to the nonwoven fabric 3 is determined based on required specifications such as the stretch amount J of the stretchable sheet 3a (S10). Here, it is assumed that the total distortion $\epsilon_{all}$ is determined as 1.7.

Next, the circumferential velocity S of the gear roll 41 (43) is determined based on line specifications such as transport velocity in a production line (S20). Here, it is assumed that the circumferential velocity S is determined to be 100 (m/min).

Subsequently, the formation pitch P of the teeth 41t (43t) and the maximum engagement depth F are determined based on the total distortion $\epsilon_{all}$ and above Expression 2 (S30 and S40). Here, the formation pitch P is determined as 4.9 (mm), and in such case the maximum engagement depth F is determined as 6.14 (mm) based on the formation pitch P of 4.9 (mm), the total distortion $\epsilon_{all}$ of 1.7, and Expression 2.

And finally, the roll diameter D is determined (S50). This determination method is performed by selecting the minimum roll diameter D of the roll diameters D in which the maximum value of the local distortion speed is included within the range of 5 to 100 (sec$^{-1}$), based on graphs in FIGS. 12A to 12D.

Figure 12A:
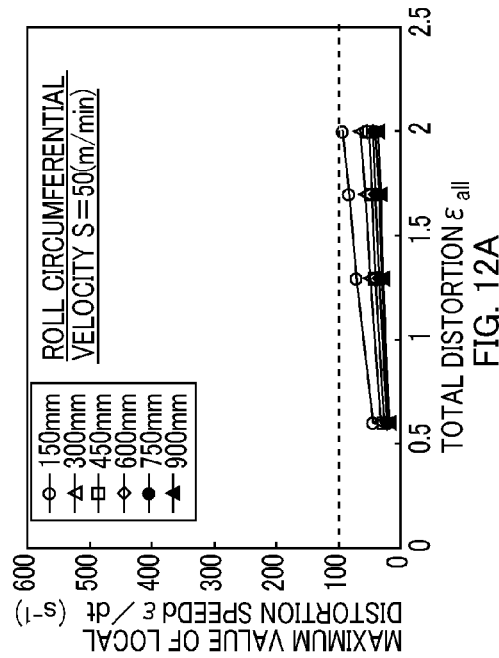
FIGS. 12A to 12D are graphs that are used in obtaining a roll diameter D in which the maximum value of the local distortion speed falls within a range of 5 to 100 (sec$^{-1}$).
Figure 12B:
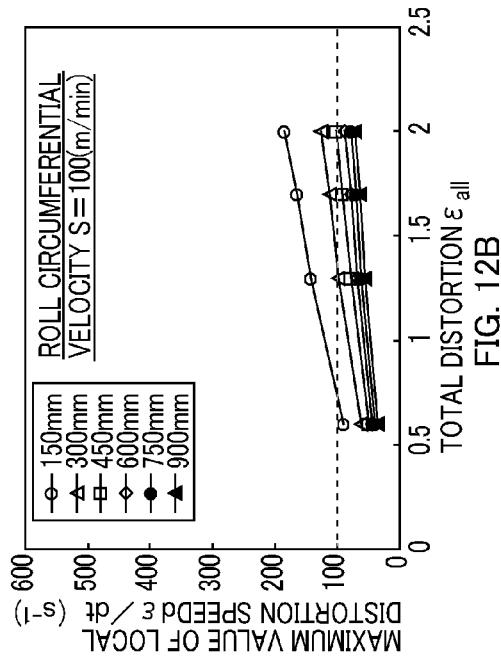
Figure 12C:
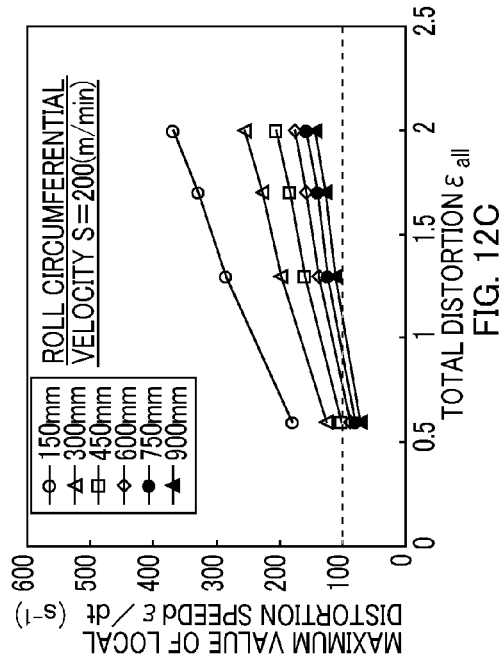
Figure 12D:
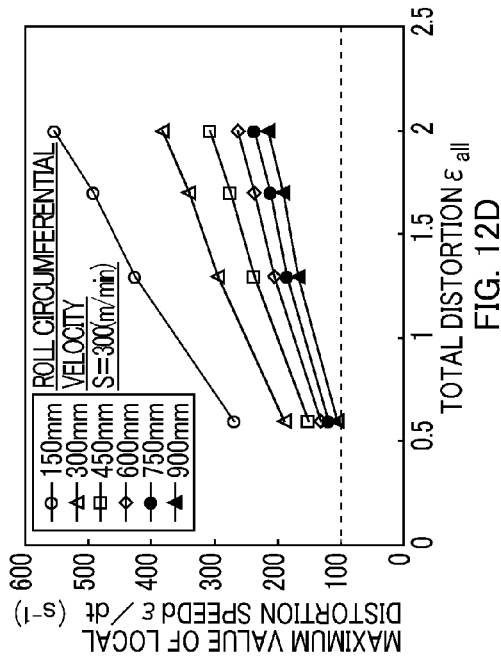

For example, in FIGS. 12A to 12D, the graphs showing a relationship between the total distortion $\epsilon_{all}$ and the maximum value of the local distortion speed are described by adopting the roll diameter D and the circumferential velocity S as parameters. That is, FIG. 12A shows the case where the circumferential velocity S is 50 (m/min), FIG. 12B shows the case where the circumferential velocity S is 100 (m/min), FIG. 12C shows the case where the circumferential velocity S is 200 (m/min), and furthermore FIG. 12D shows the case where the circumferential velocity S is 300 (m/min). And each of FIGS. 12A to 12D shows the graphs of the roll diameters D of 150, 300, 450, 600, 750, and 900 (mm).

Thus, as the above-described conditions that have already been set, first, FIG. 12B is referred in which a group of graphs with the circumferential velocity S of 100 (m/min) is described, and of these graphs, the roll diameter D is searched of which the maximum value of the local distortion speed, when the total distortion $\epsilon_{all}$ is 1.7, is included within the range of 5 to 100 (sec$^{-1}$). Here, if the roll diameter D is 300 (mm), the maximum value of the local distortion speed is 114 (sec$^{-1}$), whereas if the roll diameter D is 450 (mm), the maximum value is 92 (sec$^{-1}$) and the roll diameter D is determined as 450 (mm).

Thus, all the conditions of the gear drawing have been set.

Also each of the graphs in FIGS. 12A to 12D are calculated in advance based on the above-described engagement state diagrams. That is, the engagement state diagrams are formed by respectively varying the total distortion $\epsilon_{all}$ that should be applied to the nonwoven fabric 3, the circumferential velocity S, and the roll diameter D among a plurality of levels, and graphs of the local distortion speed and the drawing time as shown in FIG. 5 are obtained based on those engagement state diagrams. Then, the maximum value of the local distortion speed is obtained for each of the above-described levels, and the obtained maximum values are plotted on graphs of which the horizontal axis shows the total distortion $\epsilon_{all}$ and the vertical axis shows the maximum value of the local distortion speed, thereby FIGS. 12A to 12D described above are created.

Incidentally, in the above-described setting procedure, the roll diameter D was determined at last based on the graphs of the total distortion $\epsilon_{all}$ and the maximum value of the local distortion speed shown in FIGS. 12A to 12D, however this is not a limitation. The circumferential velocity S may be determined at last based engagement depth F, and the formation pitch P may be determined at last.

Preferable Range of the Roll Diameter D

FIGS. 13A to 13D are graphs in which data of the graphs in FIGS. 12A to 12D are reorganized into a relationship between the maximum value of the local distortion speed and the roll diameter D. That is, FIGS. 13A to 13D are showing the cases in which the total distortion $\epsilon_{all}$ applied by the gear drawing are 0.6, 1.3, 1.7, and 2.0 respectively, and each of FIGS. 13A to 13D shows four graphs for circumferential velocities S of 50, 100, 200, and 300 (m/min).

Figure 13A:
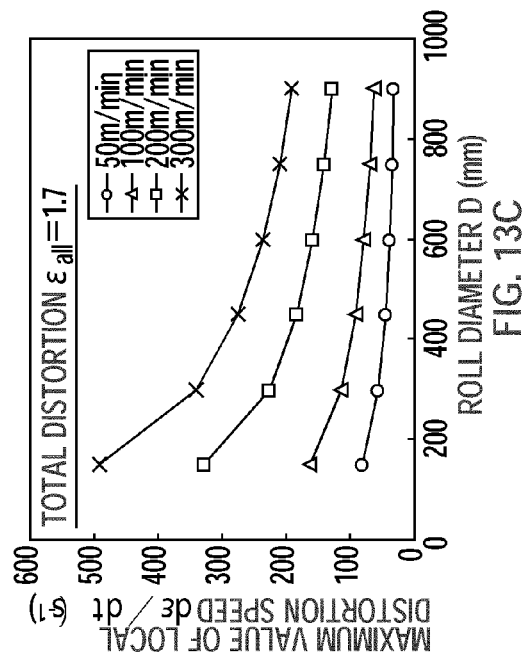
FIGS. 13A to 13D are graphs in which data of the graphs in FIGS. 12A to 12D are reorganized so as to show a relationship between the maximum value of the local distortion speed and the roll diameter D.
Figure 13B:
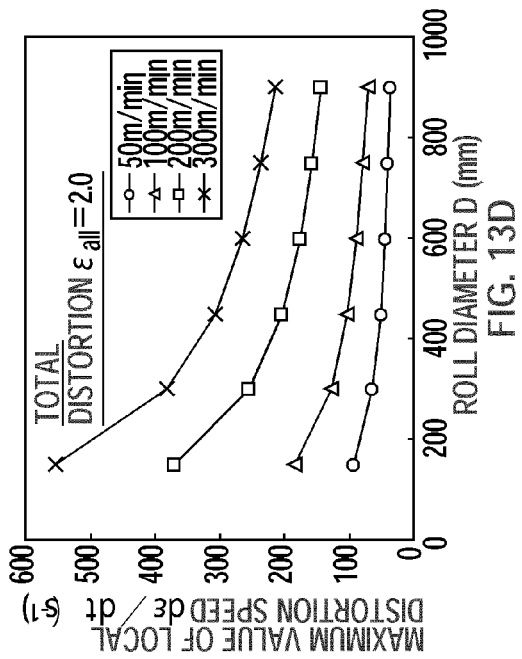
Figure 13C:
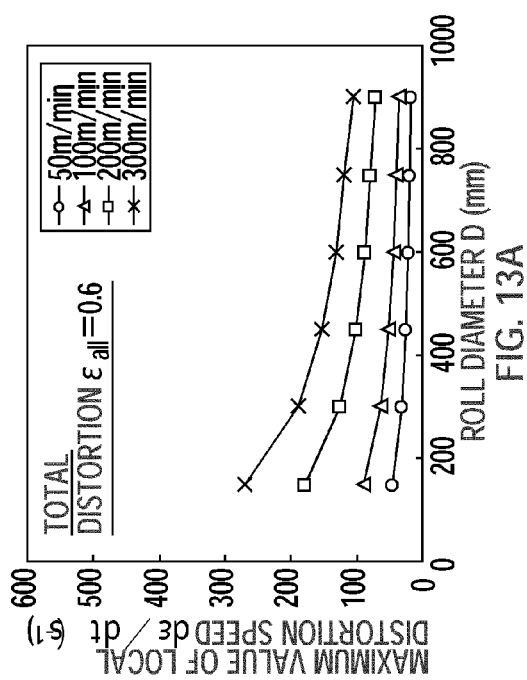
Figure 13D:
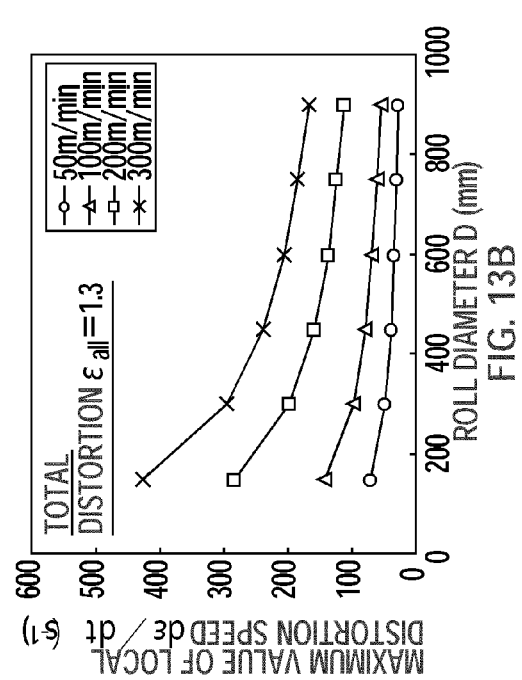

Referring to FIG. 13D, in any graph of the four different levels of the circumferential velocity S, the maximum value of the local distortion speed rapidly decreases in the case where the roll diameter D is up to about 300 to 450 (mm), but from around 600 (mm), the slope of the decrease becomes smaller, and thereafter, the slope becomes substantially flat at larger diameters.

Thus, it is considered advantageous to set the roll diameter D within a range of 300 to 600 (mm) in order to efficiently decrease the maximum value of the local distortion speed. And this tendency is recognized not only in the case where the total distortion $\epsilon_{all}$ is 2.0 in FIG. 13D but also in the cases where the total distortions $\epsilon_{all}$ are 0.6, 1.3, and 1.7 (see FIGS. 13A to 13C). Therefore, it can be said that in the case where the total distortion $\epsilon_{all}$ of an arbitrary value within a range of 0.6 to 2.0 is applied to the nonwoven fabric 3, in the case where the circumferential velocity is within the range of 50 to 300 (m/min), it is preferable to set the roll diameter D within 300 to 600 (mm).

Figure 14:
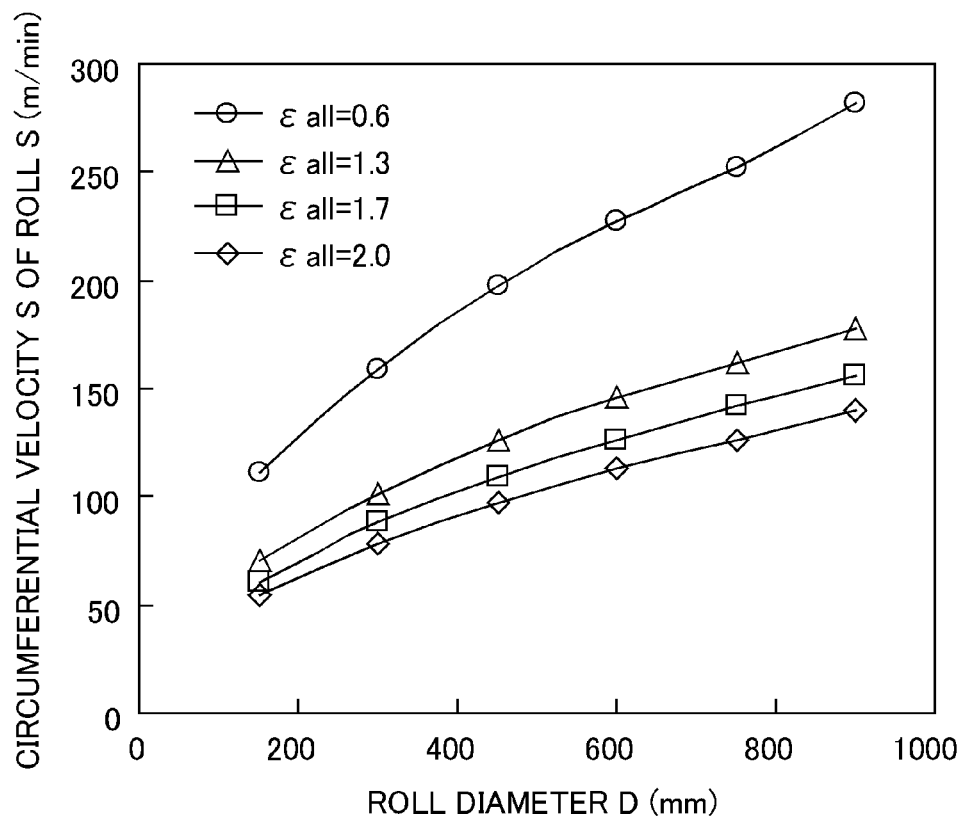
FIG. 14 is graphs showing a relationship between the circumferential velocity S and the roll diameter D in which the maximum value of the local distortion speed becomes 100 (sec$^{-1}$).

FIG. 14 shows graphs representing a relationship between the circumferential velocity S in which the maximum value of the local distortion speed becomes 100 (sec$^{-1}$) and the roll diameter D, and the level of the total distortion $\epsilon_{all}$ is varied among four levels (0.6, 1.3, 1.7, and 2.0) in the same manner as described above. Note that these graphs are also acquired based on the engagement state diagrams in the same manner as described above, by obtaining combinations of the circumferential velocity S and the roll diameter D in which the maximum value of the local distortion speed becomes 100 (sec$^{-1}$), and plotting the obtained circumferential velocities S and roll diameters D on the vertical axis and the horizontal axis.

Referring to FIG. 14, in any levels of the total distortion $\epsilon_{all}$ there is a tendency that the larger the roll diameter D, the faster the circumferential velocity S that satisfies the maximum value of the local distortion speed of 100 (sec$^{-1}$), and thus it is clear that by increasing the roll diameter D, the production capacity of the nonwoven fabric 3 can be improved by increasing the circumferential velocity S while reducing the damage to the nonwoven fabric 3 at a low level. Accordingly, in the case where productivity is taken into account, it is considered more advantageous to set the roll diameter D within a range of 450 to 600 (mm) rather than setting it within the range of 300 to 600 (mm), and setting it within a range of 550 to 600 (mm) is more preferable.

Other Embodiments

Embodiments of the present invention have been described as above, however the present invention is not limited to these embodiments and the following variations are also possible.

In the above embodiment, the nonwoven fabric 3 that includes two types of fibers that are the extensible fiber and the stretchable fiber has been illustrated as the nonwoven fabric 3 that includes a plurality of types of fibers, however the types of fibers is not limited to two types, and the nonwoven fabric 3 may include three or more types of fibers.

In the above embodiments, the commingled-type nonwoven fabric 3 that consists of the extensible fiber and the stretchable fiber blended together has been illustrated as the nonwoven fabric 3 containing a plurality of types of fibers, however the nonwoven fabric 3 is not limited to the commingled-type. For example, a layer including only the extensible fiber and a layer including only the stretchable fiber may be layered and stacked in the thickness direction of the nonwoven fabric 3. Note that the number of the layers is not limited to two, and for example, the nonwoven fabric 3 may have a three-layer structure in which a layer including only the stretchable fiber is sandwiched between upper and lower layers that include only the extensible fiber.

In the above embodiment, only the gear rolls 41 and 43 have been described as equipment for the gear drawing, however an appropriate auxiliary device may also be provided. For example, tension rolls may be respectively disposed in upstream and downstream positions of the gear rolls 41 and 43 so as to apply a tension to the nonwoven fabric 3, and a heater or the like for heating the gear rolls 41 and 43 and the tension rolls may also be disposed.

LIST OF REFERENCE NUMERALS 3 nonwoven fabric, 3a stretchable sheet, 41 gear roll, 41a outer circumferential surface, 41t teeth, 43 gear roll, 43a outer circumferential surface, 43t teeth, P formation pitch, F maximum engagement depth, P0 origin, P1 inflection point, Ps engagement start point, Pm maximum engagement point, S circumferential velocity

The invention claimed is:

1. A method of producing a stretchable sheet that is stretchable along a machine direction of the sheet, the method comprising:
   passing a nonwoven fabric including a plurality of types of fibers through a gap between a pair of gear rolls that rotate while a plurality of teeth formed on an outer circumferential surface of each of the pair of gear rolls engage with one another, the teeth being formed in a wave shape on the outer circumferential surface along a circumferential direction at a formation pitch P, top portions and bottom portions of the wave shape extending parallel with a rotational axis of each pair of gear rolls; and
   drawing the nonwoven fabric in a circumferential direction of the gear rolls by the teeth, wherein
   a circumferential velocity of the gear rolls is within a range of 50 to 300 m/min, and
   a maximum value of distortion per unit time, d$\epsilon$dt, applied to the nonwoven fabric in the gap between the pair of gear rolls is within a range of 5 to 100 sec$^{-1}$,
   wherein a value $\epsilon$ of distortion when the plurality of teeth engage with one another at a maximum engagement depth F is calculated as: $\epsilon = 2 \times (\sqrt{(F^2 + (P/2)^2)} - (P/2))/P$.

2. A method of producing a stretchable sheet according to claim 1, wherein
   a diameter of the pair of gear rolls is within a range of 300 to 600 mm.

3. A method of producing a stretchable sheet according to claim 2, wherein
   the diameter of the pair of gear rolls is within a range of 450 to 600 mm.

4. A method of producing a stretchable sheet according to claim 1, wherein
   the nonwoven fabric includes, as the plurality of types of fibers, at least a stretchable fiber and an extensible fiber that undergoes plastic deformation by an elongation smaller than an elongation of the stretchable fiber at an elastic limit, and
   the stretchable fiber is a thermoplastic elastomer fiber and the extensible fiber is a thermoplastic polyolefin fiber.

5. A method of producing a stretchable sheet according to claim 1, wherein
   the diameter of the gear roll is determined based on
   the distortion applied to the nonwoven fabric by the gear roll,
   the circumferential velocity of the gear roll,
   a formation pitch of the teeth in the circumferential direction or an engagement depth between the teeth of the pair of gear rolls, and
   the maximum value of distortion per unit time.

6. A method of producing a stretchable sheet according to claim 2, wherein
   the nonwoven fabric includes, as the plurality of types of fibers, at least a stretchable fiber and an extensible fiber that undergoes plastic deformation by an elongation smaller than an elongation of the stretchable fiber at an elastic limit, and
   the stretchable fiber is a thermoplastic elastomer fiber and the extensible fiber is a thermoplastic polyolefin fiber.

7. A method of producing a stretchable sheet according to claim 3, wherein
   the nonwoven fabric includes, as the plurality of types of fibers, at least a stretchable fiber and an extensible fiber that undergoes plastic deformation by an elongation smaller than an elongation of the stretchable fiber at an elastic limit, and the stretchable fiber is a thermoplastic elastomer fiber and the extensible fiber is a thermoplastic polyolefin fiber.

8. A method of producing a stretchable sheet according to claim 2, wherein
the diameter of the gear roll is determined based on
the distortion applied to the nonwoven fabric by the gear roll,
the circumferential velocity of the gear roll,
a formation pitch of the teeth in the circumferential direction or an engagement depth between the teeth of the pair of gear rolls, and
the maximum value of distortion per unit time.

9. A method of producing a stretchable sheet according to claim 3, wherein
the diameter of the gear roll is determined based on
the distortion applied to the nonwoven fabric by the gear roll,
the circumferential velocity of the gear roll,
a formation pitch of the teeth in the circumferential direction or an engagement depth between the teeth of the pair of gear rolls, and
the maximum value of distortion per unit time.

10. A method of producing a stretchable sheet according to claim 4, wherein
the diameter of the gear roll is determined based on
the distortion applied to the nonwoven fabric by the gear roll,
the circumferential velocity of the gear roll,
a formation pitch of the teeth in the circumferential direction or an engagement depth between the teeth of the pair of gear rolls, and
the maximum value of distortion per unit time.

11. A method of producing a stretchable sheet according to claim 6, wherein
the diameter of the gear roll is determined based on
the distortion applied to the nonwoven fabric by the gear roll,
the circumferential velocity of the gear roll,
a formation pitch of the teeth in the circumferential direction or an engagement depth between the teeth of the pair of gear rolls, and
the maximum value of distortion per unit time.

12. A method of producing a stretchable sheet according to claim 7, wherein
the diameter of the gear roll is determined based on
the distortion applied to the nonwoven fabric by the gear roll,
the circumferential velocity of the gear roll,
a formation pitch of the teeth in the circumferential direction or an engagement depth between the teeth of the pair of gear rolls, and
the maximum value of distortion per unit time.

* * * * *